Nov. 4, 1958
J. A. BEARHALTER
2,858,553
RELEASABLE THREAD CUTTING TOOL HOLDER WITH
REVERSIBLE CLUTCH MEANS FOR OPPOSITE
HAND THREAD CUTTING
Filed Aug. 24, 1955
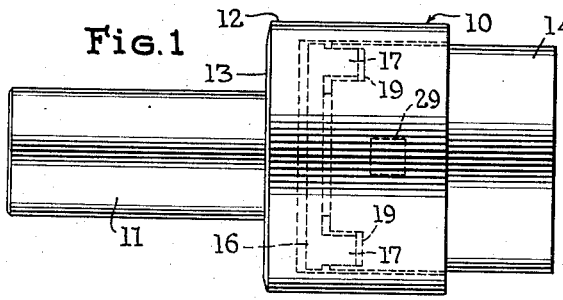
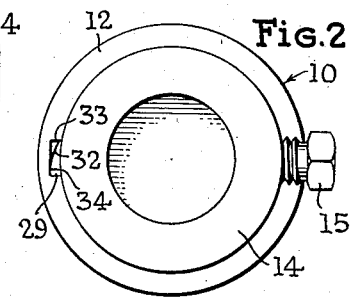
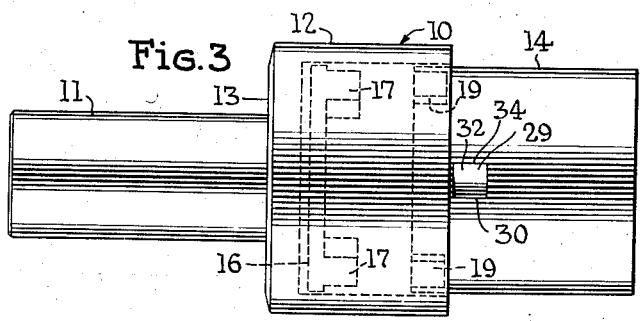
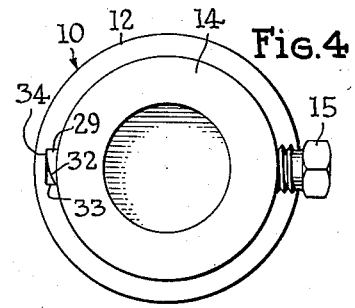
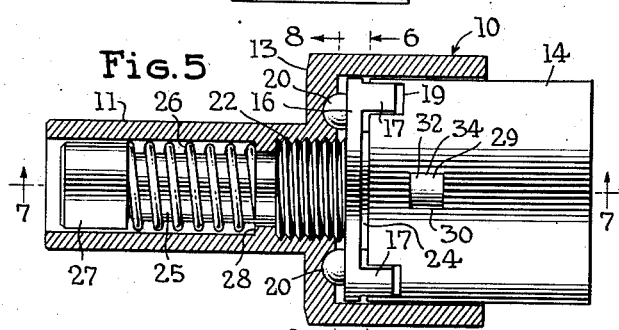
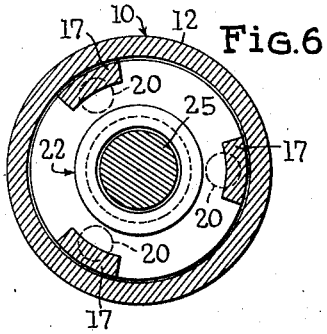
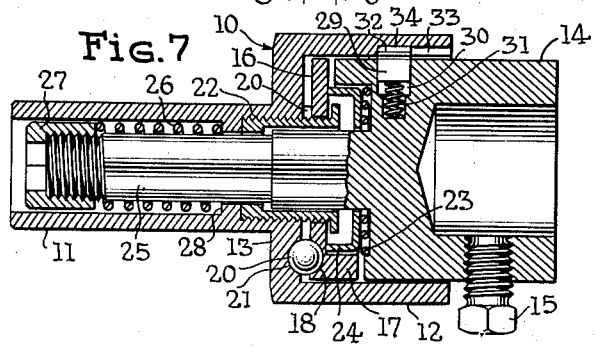
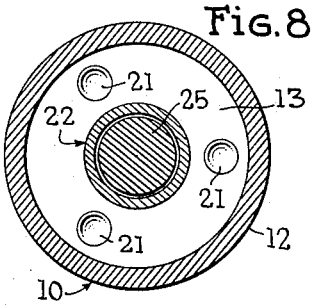
INVENTOR
John A. Bearhalter
BY Kemon and Palmer
ATTORNEYS

United States Patent Office 2,858,553
Patented Nov. 4, 1958

2,858,553

RELEASABLE THREAD CUTTING TOOL HOLDER WITH REVERSIBLE CLUTCH MEANS FOR OPPOSITE HAND THREAD CUTTING

John A. Bearhalter, North Wales, Pa.

Application August 24, 1955, Serial No. 530,377

2 Claims. (Cl. 10—129)

This invention relates to tool holders for thread cutting tools, and more particularly to automatic universal type tap and die holders for automatic screw machines, turret lathes and the like.

In the various types of tool and die holders known in the art, there is no tool holder that is reversible releasing, and non-releasing, and which may be converted from one type to another without dissassembly. A releasing tool holder of the general type disclosed in this invention is shown in the U. S. Patent to Poorman, 2,206,047. The Poorman holder must be disassembled when a reverse thread is to be cut and there is no provision for converting the Poorman holder into a non-releasing type. Releasing tool holders are known in which the clutch is not disassembled to cut right or left hand threads or vice versa. An example is the U. S. patent to Cote, 2,505,030, but there is no teaching of converting this type of tool holder to a non-releasing type.

An object of this invention is to provide a tap and die holder of the reversible releasing type that may be converted to a non-releasing type holder without disassembling the holder. This is accomplished by a novel pawl arrangement and a simplified clutch structure.

A further object of the invention is to provide a novel construction of the tool holder shell which prevents the entry of metal cuttings and other foreign matter from the internal working parts.

Other objects and advantages will be apparent from a consideration of the attached drawing and detailed description.

In the drawing:

Fig. 1 is a side elevation of the tool holder.

Fig. 2 is an end elevation, illustrating the pawl positioned to cut right hand threads.

Fig. 3 is a side elevation showing the position of the parts for removing and reversing the pawl.

Fig. 4 is an end elevation illustrating the pawl positioned to cut left hand threads.

Fig. 5 is a side elevation partly in section of the tool holder before starting a cut.

Fig. 6 is a sectional view on line 6—6 of Fig. 5.

Fig. 7 is a sectional view on line 7—7 of Fig. 5.

Fig. 8 is a sectional view on line 8—8 of Fig. 5.

Referring to the drawing for a description of a preferred embodiment, the tool holder comprises a shell 10 having a shank portion 11, a body portion 12 and an end portion 13. The shank portion 11 may be supported by a lathe turret or other equivalent machine structure.

A tool holding spindle 14 has suitable tool mounting means such as a set screw 15 (see Figs. 4 and 7) for rigidly supporting a thread cutting tool. The cutting tool is applied to the work while the latter is being rotated, as is well known in the art.

A novel clutch arrangement couples the shell 10 to the spindle 14 when rotational movement is applied to the tool holder by contact with a rotating workpiece. This clutch arrangement comprises a clutch ring 16 having rectangular clutch teeth 17 on one side and hemi-spherical recesses 18 on the other side. The rectangular clutch teeth 17 are partially engaged with the clutch teeth 19 on the spindle 14 when the tool holder is in inoperative position as shown, for example, in Fig. 5. A series of balls 20 are positioned in the clutch recesses 18 and in hemispherical recesses 21 in the shell end 13. A clutch retaining nut 22 is threaded into the shell shank 11 a predetermined distance. This retaining nut limits axial movement of the clutch ring 16 in the direction of the spindle 14. A clutch return spring 23 and washer 24 bias the clutch ring 16 against the balls 20 when the tool holder is in inoperative position and returns the clutch to its normal position after a threading operation has been completed.

The spindle stem 25 extends into shank 11. A stem spring 26 seating against spindle stem nut 27 at one end and against shoulder 28 at the opposite end biases the spindle to the left as shown in the drawings. The spring tension may be varied by adjusting the spindle stem nut 27.

A pawl 29 is mounted in a square hole 30 in the spindle 14. The pawl 29 is forced outwardly by spring 31 as best shown in Fig. 7. The pawl has a beveled outer end 32 which permits relative rotational movement between the spindle and the shell in one direction, and prevents it in the other. A longitudinal groove or keyway 33 is provided on the inner surface of the shell body 12 and the groove is substantially the same width as the pawl 29. When the beveled edge 32 of the pawl 29 is parallel to the groove 33, as shown in Figs. 2 and 4, the pawl 29 will engage the walls of the groove 33 when the spindle is rotated in one direction and will slide freely over the groove when the spindle is rotated in the opposite direction. When the pawl is turned 90° in the square hole, the high edge of the pawl end will engage both sides of the groove wall and prevent relative rotational movement between the spindle 14 and shell 10, while permitting axial sliding movement between the two parts.

Although only one pawl and groove are shown for the sake of simplicity and clarity, it is within the scope of the invention to use a plurality of grooves, pawls, or both.

The shell 10, including the portions 11, 12 and 13, is preferably integrally formed, and the end portion 13 thereof has no openings or attached plates. This construction prevents the ingress of foreign matter such as metal cuttings and the like to the inner working parts of the tool holder.

In operation, the tool holder is normally in the position shown in Figs. 1 and 7 with the clutch teeth partially in engagement. The cutting tool in the tool holder is applied to the rotating work so that a thread may be cut in the work. When a rotating workpiece engages the tool, a torque is applied to the spindle 14, and since the clutch ring 16 is partially in engagement with the spindle 14, this torque will be transmitted to the clutch ring 16. The clutch ring 16 will rotate slightly and cause the balls 20 which are held in the recesses 18 and 21 in the shell head 13 and clutch 16 to roll partially out of their recesses and force the clutch ring teeth 17 into full engagement with the clutch teeth 19 on the spindle 14. The clutch retaining nut 22 limits forward movement of the clutch ring but allows it to be engaged completely with the spindle 14. A positive drive is then effected between the body and the shell which causes the spindle 14 and shell 10 to move together as the threads are cut. When the desired length of thread is about completed, the advance of the lathe turret and the shell is stopped, but the work continues to rotate. The tool will cut a few more threads and this further thread cutting will cause the spindle 14 to advance with respect to the shell 10, thereby causing separation of the clutch teeth 17 and 19. At the instant the clutch teeth 17 and 19 are separated, the clutch return spring 23 and washer 24 force the clutch ring 16 back into the original position. In this position, the spindle 14 is allowed to spin free with the rotating work. When the rotation of the work is reversed, torque is applied in an opposite direction causing the spindle to reverse and rotate free with the work. This will continue until the pawl 29 on the spindle snaps into the groove 33 and locks the spindle 14 and the shell 10 against further relative rotational movement but permits relative axial sliding movement. This allows the spindle to slide back while the tool is backing off from the work. When the tool is released and free from the work, the shank spring 26 snaps the spindle 14 back into the original position, thus completing the thread cutting operation.

To change the tool holder from right hand to left hand thread cutting, or vice versa, the shell and spindle are separated to the extent shown in Fig. 3, to uncover the pawl while compressing the shank spring 26. The shank nut 27 may be loosened in order to relieve the tension of the spring 26 and make it easier to effect the necessary shell and spindle separation to uncover the pawl. When the pawl is uncovered, it is removed from the square hole, turned 180°, and reinserted in the hole, as shown in Figs. 2 and 4. Since the pawl top is beveled from one side to the other, reversing the high side 34 of the beveled top 32 will cause the pawl 29 to drop into the groove 33 when the direction of the thread cutting operation is reversed.

To change the tap holder from releasing to a non-releasing, the pawl is removed as described above, turned only 90°, and reinserted in the square hole. By this arrangement, two high sides of the pawl cooperate with opposite edges of the groove 33. In this position, the shell and body are locked against relative rotational movement while permitting relative axial movement, so that the tool holder functions as a non-releasing tool holder. In accordance with the illustrated and described embodiment, therefore, a single tool holder will function as a reversible releasing or a non-releasing tool holder and the change from one type to another is effected without disassembly.

While preferred embodiment of the invention has been herein shown and described, applicant claims the benefit of a full range of equivalents within the scope of the appended claims.

I claim:

1. A tap holder of the reversible type convertible to a non-releasing tap holder without disassembly of the holder to cut right or left hand threads comprising a shell having a lathe turret supported hollow shank portion and a cup-like body portion with a closed end at the connection thereof with the said shank portion, said body having hemispherical recesses in the bottom thereof, an axial groove formed in an interior wall of said body adjacent the open end thereof opposite to said shank end, a threaded socket formed in the said closed end of said body concentrically aligned with the axis of the base of said hollow shank, an annular shoulder formed in the shank adjacent the end of said threaded bore, a clutch, said clutch having a ring formed with rectangular teeth on one side and hemispherical respective recesses on the opposite side adjacent said body recesses, movable balls in said recesses, a spindle with a tool socket, said spindle having a stem concentrically formed therefrom and extending into said hollow shank, an adjustable nut on said stem, a spring coiled around said spindle housed in said shank between said nut and said annular shoulder in the shank, said clutch also including clutch teeth encircling the said spindle around the base of the said stem, a clutch return spring coiled around the base of said stem, a washer superimposed on said spring, said clutch ring and said spindle teeth forming the positive drive engageable elements of said clutch, clutch returning means having an elongated threaded exterior portion engageable with the said clutch ring to thereby limit the movement thereof, said exterior threaded portion of the retaining means being threadedly mounted in said threaded socket of said cup-like body, said rectangular clutch ring teeth and said spindle carried clutch teeth being engageable in response to torque imparted by the rotating work to said spindle and transmitted by the spindle to slightly turn the clutch ring and partially displace said balls in their respective recesses, said clutch teeth being separated by said return spring when torque is discontinued on the said spindle, whereby said spindle revolves freely with the rotating work, pawl means carried by said spindle and engageable in said axial groove formed in the wall of said body locking said spindle against rotation when the pawl engages the groove while permitting axial sliding clutch controlling movement of the spindle, said holder being reversible manually by axial movement of said pawl means against the action of said spindle spring to release said pawl from said axial groove in the wall of the body and subsequent rotation of said pawl to thereby reverse the direction of operational engagement of the pawl means in said groove.

2. The tap holder described in claim 1, wherein the said pawl comprises a beveled top, thereby providing a low side and a relatively high side, whereby reversal of the thread cutting direction causes said pawl to project into said axial groove in said cup-like body.

References Cited in the file of this patent

UNITED STATES PATENTS

| | | |
|---|---|---|
| 425,998 | Ellrich | Apr. 22, 1890 |
| 634,269 | Nicklin | Oct. 3, 1899 |
| 713,004 | Hunter | Nov. 4, 1902 |
| 1,740,887 | Crosby | Dec. 24, 1929 |
| 2,147,203 | Kylin | Feb. 14, 1939 |
| 2,206,047 | Poorman | July 2, 1940 |
| 2,432,443 | Ranney | Dec. 9, 1947 |
| 2,505,030 | Cote | Apr. 25, 1950 |
| 2,591,291 | Raymond | Apr. 1, 1952 |
| 2,723,406 | Angst | Nov. 15, 1955 |